United States Patent
Iriguchi et al.

(10) Patent No.: US 8,380,341 B2
(45) Date of Patent: Feb. 19, 2013

(54) NC PROGRAM GENERATING DEVICE AND NC PROGRAM GENERATING METHOD

(75) Inventors: Kenji Iriguchi, Tokyo (JP); Takashi Iwasaki, Tokyo (JP); Susumu Matsubara, Tokyo (JP); Mahito Matsuura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 282 days.

(21) Appl. No.: 12/675,632

(22) PCT Filed: Aug. 29, 2007

(86) PCT No.: PCT/JP2007/066764
§ 371 (c)(1),
(2), (4) Date: May 26, 2010

(87) PCT Pub. No.: WO2009/028056
PCT Pub. Date: Mar. 5, 2009

(65) Prior Publication Data
US 2010/0305745 A1    Dec. 2, 2010

(51) Int. Cl.
*G06F 19/00* (2006.01)
(52) U.S. Cl. .......................... 700/182; 700/97
(58) Field of Classification Search .................. 700/186, 700/98, 117, 159, 180, 182
See application file for complete search history.

(56) References Cited

U.S. PATENT DOCUMENTS

| | | | |
|---|---|---|---|
| 5,796,618 A * | 8/1998 | Maeda et al. | 700/182 |
| 5,808,888 A * | 9/1998 | Susnjara et al. | 700/86 |
| 6,401,004 B1 * | 6/2002 | Yamazaki et al. | 700/159 |
| 6,772,038 B2 | 8/2004 | Kadono | |
| 6,804,568 B1 | 10/2004 | Miyazaki et al. | |
| 6,862,493 B2 | 3/2005 | Matsubara et al. | |
| 6,912,445 B2 * | 6/2005 | Shiroyama et al. | 700/182 |
| 8,185,225 B2 * | 5/2012 | Miyata et al. | 700/97 |
| 2003/0130758 A1 | 7/2003 | Hirano et al. | |
| 2003/0204279 A1 | 10/2003 | Yokohari et al. | |
| 2006/0106486 A1 | 5/2006 | Tanaka et al. | |

FOREIGN PATENT DOCUMENTS

| | | |
|---|---|---|
| CN | 1797248 A | 7/2006 |
| EP | 1 209 544 A1 | 5/2002 |
| EP | 1 642 675 A1 | 4/2006 |
| JP | 02-072413 A | 3/1990 |
| JP | 2-072413 A | 3/1990 |
| JP | 10-011123 A | 1/1998 |
| JP | 2001-084018 A | 3/2001 |
| JP | 2002-189510 A | 7/2002 |
| JP | 2003-177811 A | 6/2003 |
| JP | 2006-053945 A | 2/2006 |

OTHER PUBLICATIONS

Extended European Search Report issued Mar. 28, 2012 for corresponding European Patent Application No. 07806241.1.
Chinese Office Action dated Jun. 5, 2012, issued in corresponding Chinese Patent Application No. 200780100447.4.

\* cited by examiner

*Primary Examiner* — Dave Robertson
(74) *Attorney, Agent, or Firm* — Sughrue Mion, PLLC

(57) ABSTRACT

In an NC program generating device that extracts shaping sites that are process areas of a workpiece based on the three-dimensional geometrical data of the unprocessed workpiece and the three-dimensional geometrical data of the processed workpiece and generates an NC program in accordance with the extracted shaping sites, the process attribute information setting unit sets up workpiece attribute information, based on related information of process operations feasible on the processing machine for the workpiece and the features, position, and direction of a shaping site of the three-dimensional shape of the processed workpiece that is configurable in the process attribute information.

10 Claims, 10 Drawing Sheets

SYMBOL INDICATING INFEASIBLE STATE

SELECTED SHAPING SITE

NC PROGRAM GENERATING DEVICE AND NC PROGRAM GENERATING METHOD

TECHNICAL FIELD

The present invention relates to an NC program generating device and an NC program generating method for generating an NC program.

BACKGROUND ART

A device that builds a product model by adding processing information to three-dimensional geometrical data (product modeling device) has been developed to facilitate the processing of a three-dimensional shape on a processing machine. In the product modeling device, processing site models that include shapes of processing areas and processing attribute information (such as process operations) corresponding processing patterns are prepared in advance in a processing site library. Then, on a computer-aided design (CAD) device, a blank model and a processing site model of the processing site library are combined to build a product model to which processing information is added (see Patent Document 1, for example).

Furthermore, a device that automatically generates an NC program based on the three-dimensional geometrical data in a CAD device has been suggested. This device extracts a shape of a processing area that corresponds to a difference between the three-dimensional product data and the blank geometrical data, and divides the extracted shape of the processing area into sets of shapes of areas that are to be subjected to basic processing. Then, a process operation, conditions and the like are determined for the shape of each basic processing area to generate an NC program (see Patent Document 2, for example).

In addition, a device has been suggested, which generates an NC program by extracting a specific geometrically characteristic site from the three-dimensional geometrical data of a product and generating processing procedure information such as a process operation and conditions and processing area information for the extracted geometrically characteristic site (see Patent Document 3, for example).

Patent Document 1: Japanese Patent Application Laid-open No. 2003-177811
Patent Document 2: Japanese Patent Application Laid-open No. 2006-53945
Patent Document 3: Japanese Patent Application Laid-open No. 2002-189510

DISCLOSURE OF INVENTION

Problem to be Solved by the Invention

According to the first document of the above conventional technology, however, a problem resides in that, when product designing and process procedure designing are separately performed, if special processing expertise in the process procedure designing based on the processing facilities (such as a processing machine) is available, such processing expertise cannot be reflected to the product designing.

Moreover, according to the second and third documents of the above conventional technology, the generated NC program may not always incorporate processing expertise in the process procedure designing, and therefore the generated NC program often needs to be revised. In the generated NC program, because the processing sites and units of the NC program are automatically brought into correspondence with each other, the revision of the NC program is a troublesome task, requiring that the operator identify where to revise and obtain coherent numerical information for revision.

The present invention has been conceived in light of the above. The purpose of the present invention is to offer an NC program generating device and an NC program generating method, with which an NC program adopting an appropriate process operation in correspondence with a processing machine can be readily generated.

Means for Solving Problem

In order to solve the above problem, and to attain the above object, in an NC program generating device that extracts shaping sites, which are process areas of a workpiece, based on three-dimensional geometrical data of the workpiece that is unprocessed and three-dimensional geometrical data of the workpiece that is processed, and generates an NC program in correspondence with the shaping sites that are extracted, the NC program generating device of the present invention includes a process attribute information setting unit that sets process attribute information that is used for generation of the NC program and includes information of a process operation that can be used to process the workpiece on a processing machine, in the three-dimensional geometrical data of the workpiece that is processed, wherein the process attribute information setting unit sets the process attribute information of the workpiece, based on related information of the process operation that can be used to process the workpiece on the processing machine and a characteristic, a position, and a direction of a shaping site in a three-dimensional shape of the workpiece that is processed, the shaping site being configurable as the process attribute information for the workpiece on the processing machine, and also extracts, when setting the process attribute information, configurable items of the process attribute information by use of at least one of information regarding a position of a processing tool included in the processing machine, information regarding an axial direction of a rotation axis around which the workpiece is rotated, information regarding an axial direction of a rotation axis around which the working tool is rotated, and information regarding a placement position of the workpiece.

Effect of the Invention

According to the present invention, when setting process attribute information in three-dimensional geometrical data of a processed workpiece, information on an appropriate process operation that can be used on a processing machine for an appropriate geometrical site of the three-dimensional geometrical data of the processed workpiece can be included in the three-dimensional geometrical data, based on information associating process operations available on the processing machine for processing the workpiece with characteristics, positions, and directions of geometrical sites of the three-dimensional shape of the processed workpiece for which the process attribute information is configurable, and also extracts, when setting the process attribute information, configurable items of the process attribute information by use of at least one of information regarding a position of a processing tool included in the processing machine, information regarding an axial direction of a rotation axis around which the workpiece is rotated, information regarding an axial direction of a rotation axis around which the working tool is rotated, and information regarding a placement position of

EXPLANATIONS OF LETTERS OR NUMERALS

Figure 1:
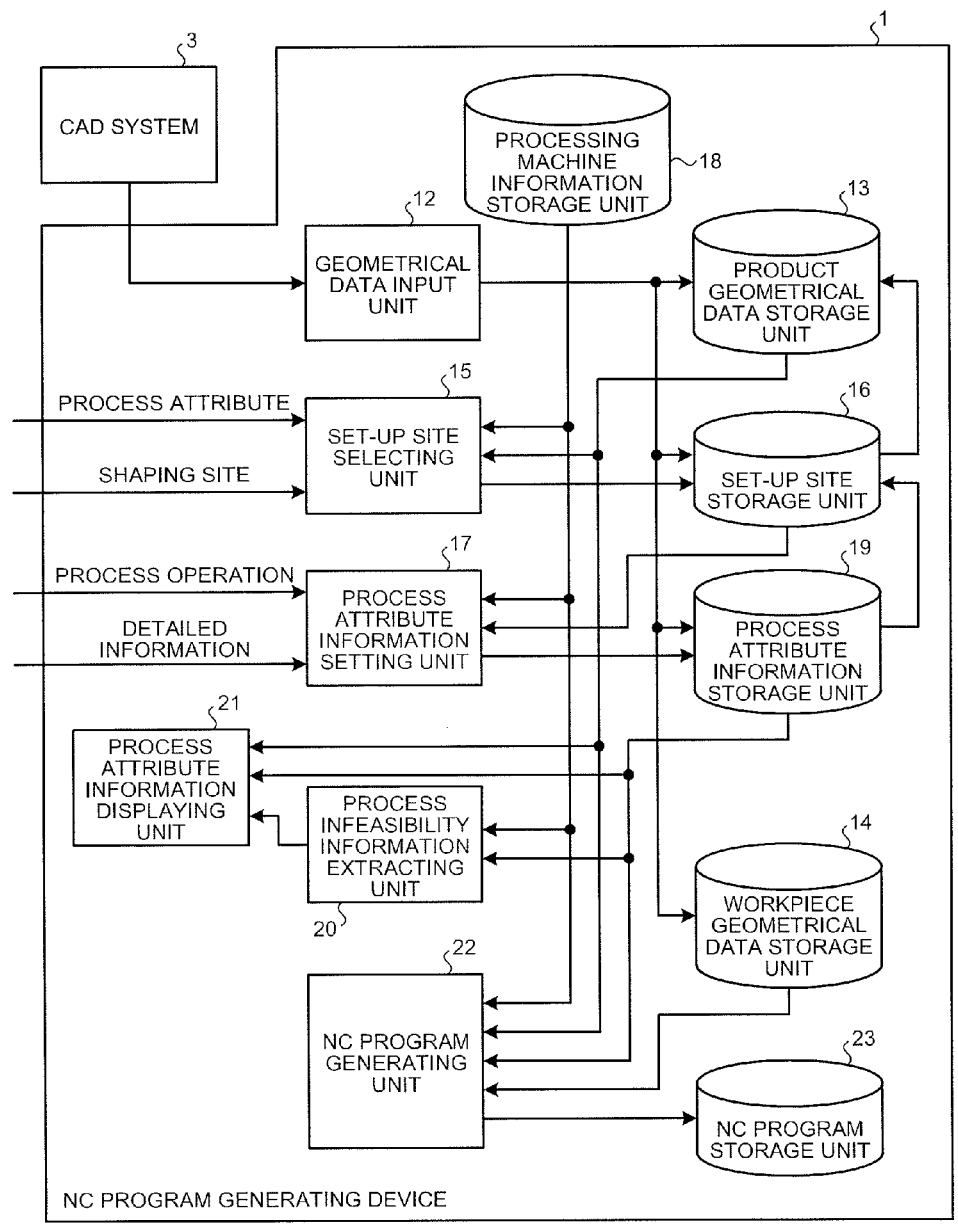
FIG. 1 is a diagram for showing the structure of an NC program generating device according to an embodiment of the present invention.

1 Program generating device
3 CAD system
12 Geometrical data input unit
13 Product geometrical data storage unit
14 Workpiece geometrical data storage unit
15 Set-up site selecting unit
16 Set-up site storage unit
17 Process attribute information setting unit
18 Processing machine information storage unit
19 Process attribute information storage unit
20 Process infeasibility information extracting unit
21 Process attribute information displaying unit
22 NC program generating unit
23 NC program storage unit
41 Process attribute list display window
43 Structure display window
45 Detailed information set-up window
47 Process operation selection option field
49 Detailed information input and edit field
51 List display window
53 Operation selection field
61 Chuck
62 Mounting retainer
63 Process workpiece
64 Lathe turning axis
65 Workpiece rotation axis
71, 81 Blade base
72, 82 Blade base rotation axis
73, 83 Holder
74 Turning tool
84 Milling tool
85 Tool rotation axis
101 to 109 Display screen
A1 Shaping site
T1 to T3 Selectable shaping sites

BEST MODE(S) FOR CARRYING OUT THE INVENTION

Exemplary embodiments of an NC program generating device according to the present invention are explained in detail below with reference to the drawings. These embodiments are not intended to limit the invention.

Embodiments

FIG. 1 is a diagram for showing the structure of the NC program generating device according to an embodiment of the present invention. An NC program generating device 1 sets up process attribute information including process operations that can be performed by a control-target processing machine in three-dimensional geometrical data of a product, and generates an NC program based on this three-dimensional geometrical data. The process operations include, for example, threading and lathe tapping. The process attributes include, for example, a screw thread and a hole.

The NC program generating device 1 includes a geometrical data input unit 12, a product geometrical data storage unit 13, a workpiece geometrical data storage unit 14, a set-up site selecting unit 15, a set-up site storage unit 16, a process attribute information setting unit 17, a processing machine information storage unit 18, a process attribute information storage unit 19, a process infeasibility information extracting unit 20, a process attribute information displaying unit (displaying unit) 21, an NC program generating unit 22, and an NC program storage unit 23.

The geometrical data input unit 12 is connected to the product geometrical data storage unit 13, the workpiece geometrical data storage unit 14, the set-up site storage unit 16, and the process attribute information storage unit 19. Moreover, the set-up site selecting unit 15 is connected to the processing machine information storage unit 18, the product geometrical data storage unit 13, and the set-up site storage unit 16.

The process attribute information setting unit 17 is connected to the processing machine information storage unit 18, the set-up site storage unit 16, and the process attribute information storage unit 19. Furthermore, the process infeasibility information extracting unit 20 is connected to the processing machine information storage unit 18, the process attribute information storage unit 19, and the process attribute information displaying unit 21.

The NC program generating unit 22 is connected to the processing machine information storage unit 18, the product geometrical data storage unit 13, the process attribute information storage unit 19, the workpiece geometrical data storage unit 14, and the NC program storage unit 23. Moreover, the set-up site storage unit 16 is connected to the product geometrical data storage unit 13 and the process attribute information storage unit 19. The process attribute information displaying unit 21 is connected to the product geometrical data storage unit 13 and the process attribute information storage unit 19.

The geometrical data input unit 12 is connected to a CAD system 3, which is an external device, and receives from the CAD system 3 the three-dimensional geometrical data of a product (a workpiece that has been processed) (hereinafter, "product geometrical data") and the three-dimensional geometrical data of a blank (a workpiece that is yet to be processed) (hereinafter, "workpiece geometrical data"). The product geometrical data includes information (product arrangement information) on the arrangement (locations and directions) of shaping sites of the product. The product geometrical data is three-dimensional geometrical data of a workpiece after it is subjected to drilling, chamfering, and the like, while the workpiece geometrical data is three-dimensional geometrical data of the workpiece before it is subjected to drilling, chamfering, and the like. A shaping site is a portion that is to be processed into a product (process area). The shaping site may be a position at which drilling is to be performed or an area that is to be chamfered.

The geometrical data input unit 12 stores the product geometrical data received from the CAD system 3 in the product geometrical data storage unit 13, and stores the workpiece geometrical data received from the CAD system 3 in the workpiece geometrical data storage unit 14.

The product geometrical data storage unit 13 is a memory or the like that stores therein the product geometrical data received from the geometrical data input unit 12, while the workpiece geometrical data storage unit 14 is a memory or the like that stores therein the workpiece geometrical data received from the geometrical data input unit 12.

The processing machine information storage unit 18 is a memory or the like that stores therein information regarding a processing machine that is a target of control (such as types of processing operations that can be performed on the processing machine and processing conditions that can be adopted for the processing machine) as processing machine information. In the processing machine information, processing functions of the processing machine, processing operation types corresponding to the processing functions, processing conditions corresponding to the processing functions, items of the characteristics, locations, directions of shaping sites of a product structure that can be set up for each processing operation type and processing attribute are associated with one another in accordance with processing machines. The processing operations of the processing machine information include, for example, "threading", "lathe tapping", "mill tapping", and "boring".

The set-up site selecting unit 15 extracts possible shaping sites of the product structure in which the process attribute designated by the operator can be set, in accordance with the product geometrical data in the product geometrical data storage unit 13, the processing machine information in the processing machine information storage unit 18, and the process attribute information externally input by the operator. Based on shaping site designation information externally input by the operator, a target shaping site of the process attribute is determined from the extracted possible shaping sites.

For example, when the process attribute externally input by the operator is "screw thread", the set-up site selecting unit 15 extracts a hole and a shank having a central axis that matches the lathe turning axis from the product geometrical data as possible shaping sites of the setting-target process attribute, based on the items of the characteristics, positions, and directions of the shaping sites of a product structure that can be set for the process attribute described in the processing machine information, and determines the target shaping site from the possible shaping sites, based on the shaping site designation information externally input by the operator.

The set-up site selecting unit 15 stores the information of the determined shaping site as shaping site information in the set-up site storage unit 16. The set-up site storage unit 16 is a memory or the like that stores therein the shaping site information extracted by the set-up site selecting unit 15.

The process attribute information setting unit 17 receives the shaping site information stored in the set-up site storage unit 16 and the processing machine information stored in the processing machine information storage unit 18, and determines and extracts possible processing operations that can be performed onto the shaping site by the processing machine. For example, when the processing machine information indicates "complex lathe", and when the shaping site indicated in the shaping site information as the setting target of the process attribute "screw thread" is a hole or a shank whose center axis corresponds to the lathe turning axis, "threading" or the like is extracted as a possible process operation that can be performed on the shaping site by the processing machine.

The process attribute information setting unit 17 extracts a process operation that corresponds to the operator's instruction (information designating the process operation) from the extracted process operations. Furthermore, the process attribute information setting unit 17 receives the input of information regarding the detailed process settings for the extracted process operation (detailed information) from the operator, and stores the extracted process operation type and the detailed information regarding this process operation type as the process attribute information in the process attribute information storage unit 19. In other words, the process attribute information setting unit 17 extracts a process operation type corresponding to the process function of the processing machine from the process operation types available on the processing machine, based on the processing direction, location, shape, and the like for processing the process area. The process attribute information storage unit 19 is a memory or the like that stores therein the process attribute information set by the process attribute information setting unit 17.

The process infeasibility information extracting unit 20 determines whether the control-target processing machine can perform the process operation indicated in the process attribute information, based on the processing machine information stored in the processing machine information storage unit 18, the process attribute information stored in the process attribute information storage unit 19, and the product arrangement information that is included in the product geometrical data stored in the product geometrical data storage unit 13. The process infeasibility information extracting unit 20 notifies the process attribute information displaying unit 21 of the process attribute information that is determined to be infeasible.

The process attribute information displaying unit 21 has a displaying facility such as a liquid crystal display monitor. Based on the process attribute information stored in the process attribute information storage unit 19 and the process attribute information stored in the process infeasibility information extracting unit 20 and determined to be infeasible, the process attribute information displaying unit 21 displays a list of process attribute information set in relation to the product structure, by sorting the process attribute information into feasible and infeasible items.

The process attribute information displaying unit 21 displays various kinds of information such as a three-dimensional shape, detailed information, and shaping sites of the product, based on the information stored in the product geometrical data storage unit 13, the set-up site storage unit 16, the processing machine information storage unit 18, the process attribute information storage unit 19, and the like. When an instruction for adjusting the placement of the product structure (placement adjustment instruction) is input to the geometrical data input unit 12, the process attribute information displaying unit 21 displays the three-dimensional shape of the product in a perspective view in accordance with the placement adjustment instruction.

The NC program generating unit 22 receives various kinds of data (the product geometrical data, the workpiece geometrical data, the processing machine information, and the process attribute information) from the product geometrical data storage unit 13, the workpiece geometrical data storage unit 14, the processing machine information storage unit 18, and the process attribute information storage unit 19, and extracts the shape of the process area (process area shape) based on the difference between the shapes of the product and the workpiece. The NC program generating unit 22 separates the extracted process area shape into the sets of basic process patterns of the process area shape. Then, the NC program generating unit 22 determines a process operation type, process conditions, and the like in accordance with the separated process area shape, based on the various kinds of received data, and thereby generates an NC program. In other words, the NC program generating unit 22 generates the NC program by use of the process operation in the process attribute information determined by the process attribute information setting unit 17. More specifically, the NC program generating unit 22 according to the present embodiment determines the process operation, process conditions, and the like, based on the determination as to whether there is process attribute information feasible on the control-target processing machine with respect to the separated process area shape. When there is process attribute information feasible on the control-target processing machine with respect to the separated process area shape, the NC program generating unit 22 generates an NC program incorporating the process operation and the process conditions of this process attribute information.

In this manner, the NC program generating unit 22 sets up the process attribute information that is to be attached to the product geometrical data in accordance with the processing machine, and generates an NC program suitable for the processing machine. The NC program generating unit 22 generates the overall NC program, by combining different NC programs generated for the separated portions of the process area shape, and stores the generated NC program in the NC program storage unit 23. The NC program storage unit 23 is a memory or the like that stores therein the NC program generated by the NC program generating unit 22.

Figure 2:
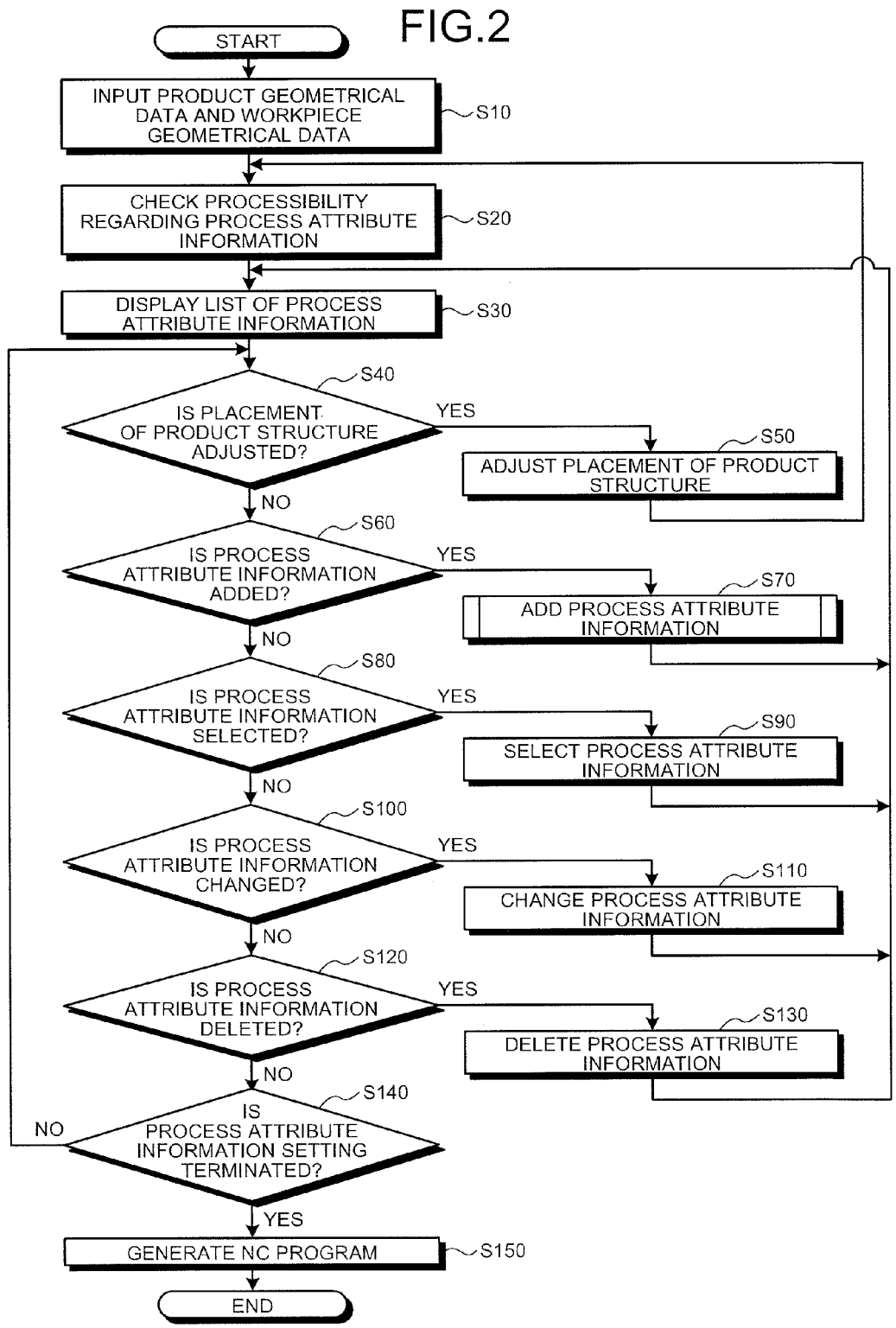
FIG. 2 is a flowchart for showing the operational procedure of the NC program generating device.

Next, the procedure of the operation of the NC program generating device 1 is explained below. FIG. 2 is a flowchart for showing the procedure of the operation of the NC program generating device. The information indicating the control-target processing machine and the information indicating the target product structure of the production conducted by the NC program is input in advance to the NC program generating device 1. More specifically, identification information identifying the processing machine (e.g., M0001) is input as the information indicating the processing machine, and identification information identifying the product structure (e.g., P0002) is input as the information indicating the product structure.

In the course of the following process, the NC program generating device 1 operates in the order of steps S10, S60, and S70 at the beginning of the NC program generation. Further, the operations at steps S20 to S50 are executed after the NC program is generated.

When the product geometrical data and the workpiece geometrical data created on the CAD system 3 is input to the geometrical data input unit 12, the product geometrical data is put into the product geometrical data storage unit 13, and the workpiece geometrical data is put into the workpiece geometrical data storage unit 14 (step S10).

When the process attribute information is already stored in the process attribute information storage unit 19, the process infeasibility information extracting unit 20 extracts the production-target process attribute information for the NC program from the process attribute information storage unit 19. In addition, the process infeasibility information extracting unit 20 acquires the processing machine information from the processing machine information storage unit 18, the process attribute information from the process attribute information storage unit 19, the product arrangement information included in the product geometrical data from the product geometrical data storage unit 13. Then, the process infeasibility information extracting unit 20 determines whether the process operation indicated in the process attribute information can be performed on the control-target processing machine (processibility), based on the processing machine information corresponding to the control-target processing machine and the arrangement of the shaping site corresponding to the process attribute information (step S20).

The process infeasibility information extracting unit 20 notifies the process attribute information displaying unit 21 of the process attribute information that is determined to be infeasible as a result of checking. The process attribute information displaying unit 21 sorts the process attribute information of the process structure into feasible and infeasible items and displays it as a list on the process attribute information displaying unit 21, based on the process attribute information received from the process attribute information storage unit 19 and the infeasible process attribute information notified by the process infeasibility information extracting unit 20 (step S30).

Figure 3:
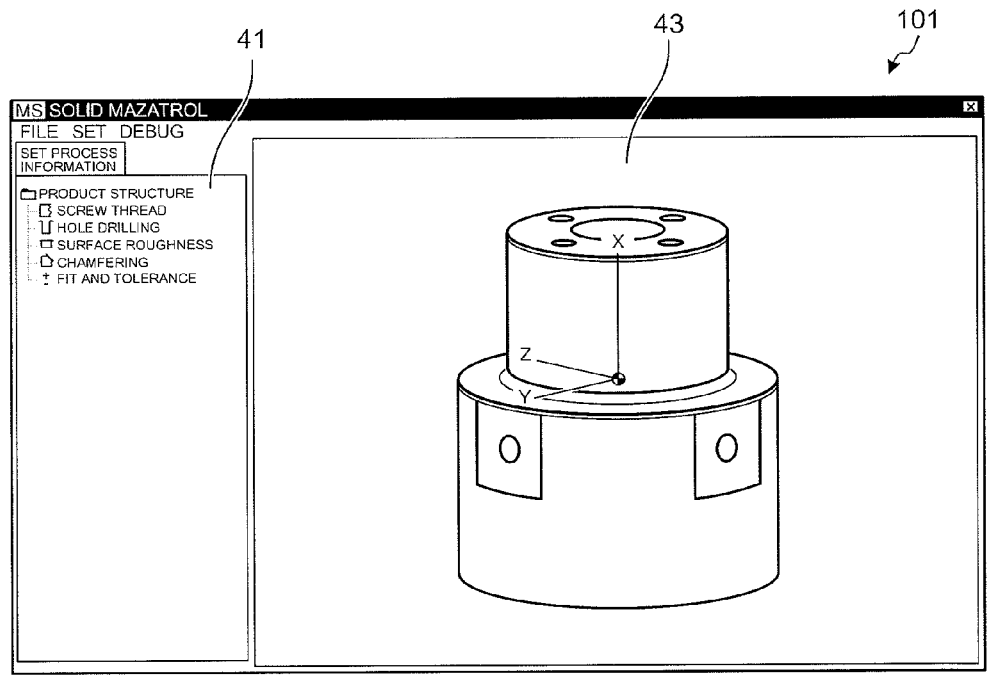
FIG. 3 is a diagram for showing an example screen for setting process attribute information.

FIG. 3 is a diagram for showing an example screen for setting up the process attribute information. A process attribute list display window 41 indicating a list of process attributes that can be dealt with on the processing machine and a structure display window 43 three-dimensionally illustrating the product structure corresponding to the product geometrical data are displayed on the display screen 101 of FIG. 3. The process attributes include a screw thread (thread-cutting), drilling, surface roughness (surface treating), and corner-rounding (chamfering). The screw thread, drilling, surface roughness, and chamfering presented in the process attribute list display window 41 are presented on the display screen 101 by use of the data received from the CAD system 3 and attached to the CAD data, such as the product geometrical data and the workpiece geometrical data. A perspective view or the like of the product structure viewed from a specific angle is three-dimensionally illustrated in the structure display window 43.

For example, when the operator selects a shaping site (the shaping site including the information regarding the shape of a hole or the like and the information regarding the coordinates of the hole or the like) by way of the set-up site selecting unit 15, the set-up site selecting unit 15 displays selectable shaping sites onto the process attribute information displaying unit 21 in an identifiable manner, based on the processing machine information and the shaping site information. Here, the set-up site selecting unit 15 may highlight the selectable shaping sites when displaying them on the process attribute information displaying unit 21.

When the product structure is arranged as shown in the structure display window 43 of FIG. 3 and the screw thread is selected in the process attribute list display window 41, the positions of the hole and screws may be highlighted as selectable options. On the other hand, because the lathe turning axis and the center axis of the product structure are orthogonal to each other, the periphery of the product cannot be threaded. Thus, the periphery that cannot be threaded is not highlighted.

When the display screen 101 is provided, the NC program generating device 1 determines whether an instruction for adjusting the placement of the product structure is input to the geometrical data input unit 12 by the operator (step S40). When the instruction for adjusting the placement of the product structure is input to the geometrical data input unit 12 (yes at step S40), the geometrical data input unit 12 adjusts (changes) the placement of the product structure in accordance with the operator's instruction, and displays it on the process attribute information displaying unit 21 (step S50).

Then, the NC program generating device 1 returns to the process of step S20. In other words, the process infeasibility information extracting unit 20 judges whether the processing can be performed by the control-target processing machine with respect to the process attribute information after the adjustment of the placement. More specifically, the process infeasibility information extracting unit 20 judges whether the process operation indicated in the process attribute information can be performed on the control-target processing machine (processibility), based on the information of the control-target processing machine and the arrangement of the shaping site corresponding to the process attribute information (step S20). In the following description, the NC program generating device 1 performs the processes of step S30 and subsequent steps.

Figure 4:
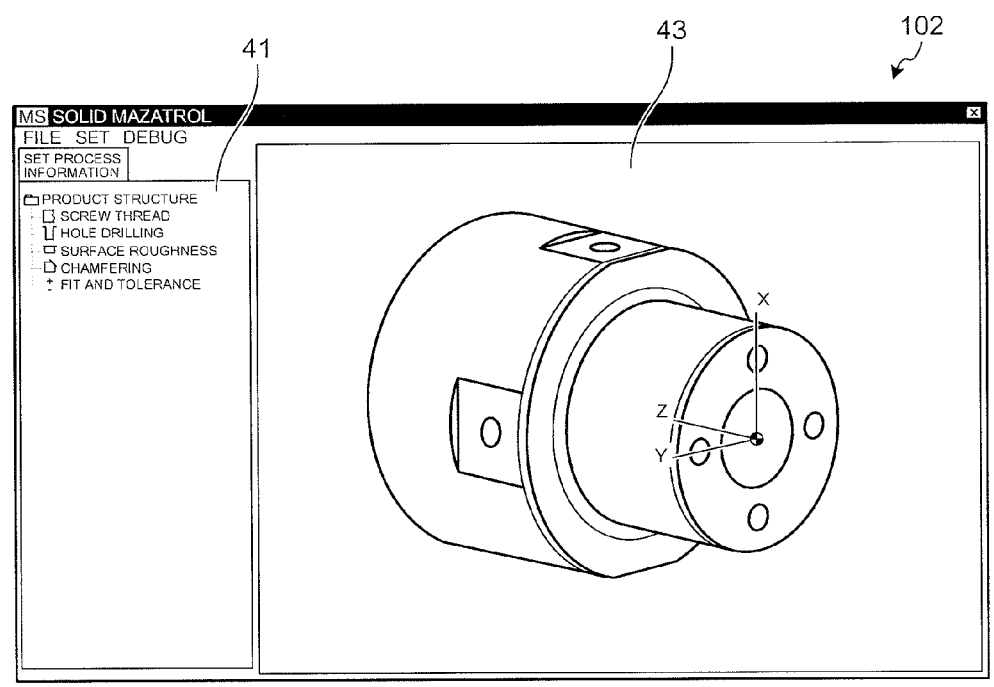
FIG. 4 is a diagram for showing an example screen after the placement of a product structure is adjusted.

FIG. 4 is a diagram for showing an example screen after the adjustment of the placement of the product structure. The display screen 102 of FIG. 4 presents the placement of the product structure that has been changed from the placement of FIG. 3. On the display screen 102, the control-target processing machine is a complex lathe, and the placement of the product structure has been adjusted in such a manner that the lathe turning axis (the z-axis in the structure display window 43) coincides with the center axis of the product structure, as illustrated in FIG. 4, for example. After the placement of the product structure is adjusted, the process attributes that can be dealt with on the processing machine are changed.

When the product structure is placed as shown in the structure display window 43 of FIG. 4, and the screw thread is selected in the process attribute list display window 41, the periphery of the product can be threaded because the lathe turning axial line and the center axis of the product structure coincide with each other. Thus, the peripheral portion that can be threaded is highlighted. If a portion that is not selectable is selected by the operator, the NC program generating device 1 does not execute the operation in accordance with the selected operation.

Figure 5:
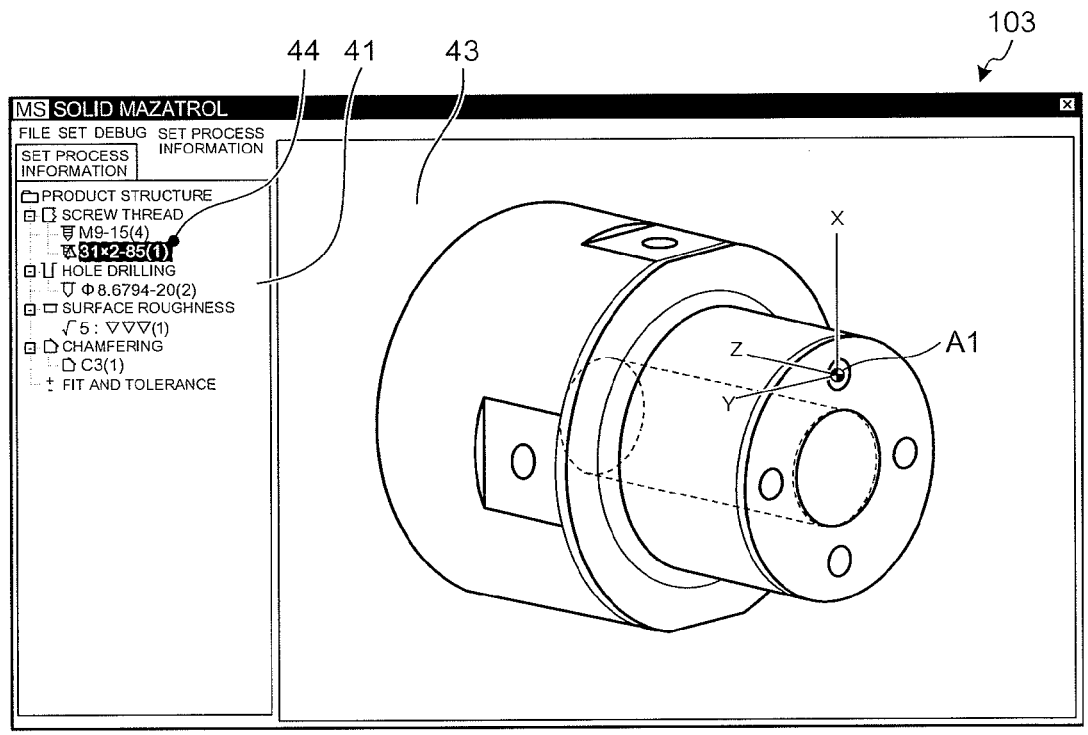
FIG. 5 is a diagram for showing an example screen display of process attribute information after the placement of the product structure is adjusted.
Figure 6:
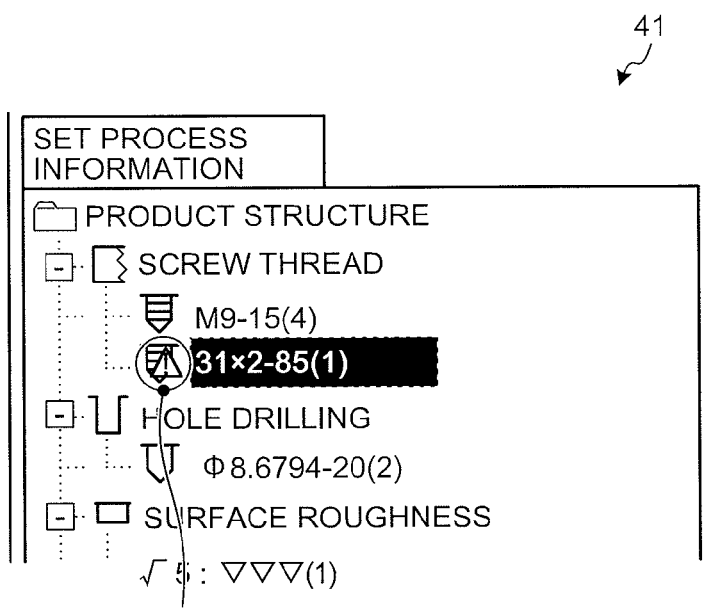
FIG. 6 is a diagram for showing a process attribute list display window after the placement of the product structure is adjusted.

FIG. 5 is a diagram for showing an example screen display of process attributes after the placement of the product structure is adjusted. Moreover, FIG. 6 is a diagram for showing the process attribute list display window after the placement of the product structure is adjusted.

The display screen 103 of FIG. 5 is displayed in accordance with the operations of steps S20 to S50 of the NC program generating device 1. In the display screen 103 of FIG. 5, after the process attribute and the process condition are set up as the process attribute information, the product structure that has been repositioned from an upright position to a sideways position (with the center axis of the product structure coinciding with the lathe turning axis) is further shifted to a position at which the center axis of the product structure is displaced from the lathe turning axis.

The process attributes of the shaping site are displayed for different process structures in the process attribute list display window 41. Furthermore, when the process condition is set for a process attribute, this process condition is displayed under the display position of the process attribute in the process attribute list display window 41. For example, when process conditions such as "M9-15(4)" and "31×2-85(1)" are input for the process attribute "screw thread" by the operator, these process conditions are displayed under "screw thread".

If an input process condition cannot be dealt with by the processing machine, a symbol indicating a state of not being processible is displayed in the vicinity of the display position of the process condition. For example, the symbol indicating a state of not being processible is displayed in the vicinity of a process condition 44 "31×2-85(1)" in the process attribute list display window 41 on the left side of the display screen 103. In such a situation, when the spot of "31×2-85(1)" is designated by the operator, the positions of the product structure corresponding to "31×2-85(1)" (hole center positions serving as the centers of four holes) are displayed in an identifiable manner. At the time of setting a process condition for the hole center positions, which are processing sites, even if "31×2-85(1)" of the process condition 44 can be input, the product threading process cannot be performed as long as the lathe turning axis A1 is displaced from the center axis of the product structure. On the display screen 103 according to the present embodiment, a symbol indicating the state of not being processible is displayed for a process condition that is not feasible. Here, "31×2-85(1)" represents one unit of 31 (inner diameter)×2 (pitch)-85 (length of screw).

If no instruction for adjusting the placement of the product structure is input to the geometrical data input unit 12 (no at step S40), the set-up site selecting unit 15 determines whether any instruction for adding the process attribute information is received from the operator (step S60). As a result of the determination, if an instruction for adding the process attribute information is input (yes at step S60), the set-up site selecting unit 15 sends the instruction for adding the process attribute information to the process attribute information setting unit 17. In response to the operator's instruction, the process attribute information setting unit 17 adds a new item of process attribute information (step S70).

Figure 7:
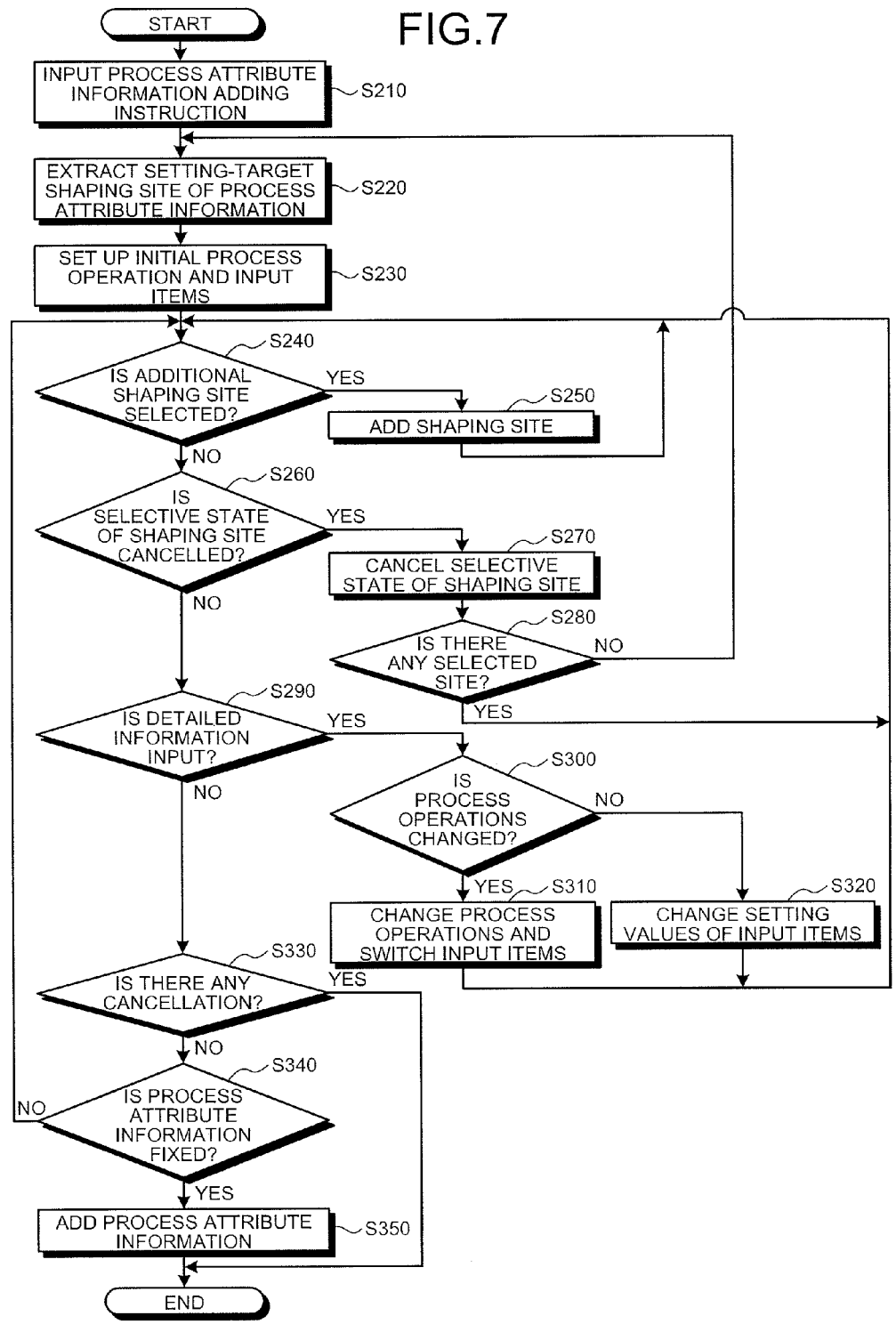
FIG. 7 is a flowchart of the process procedure for adding a new item of process attribute information.

The procedure of the process at step S70 (the new process attribute information adding process) is now explained in detail. FIG. 7 is a flowchart of the procedure of the new process attribute information adding process. When a process attribute is externally input as an instruction for adding the process attribute information to the set-up site selecting unit 15 by the operator, this instruction is sent to the set-up site selecting unit 15 (step S210).

Figure 8:
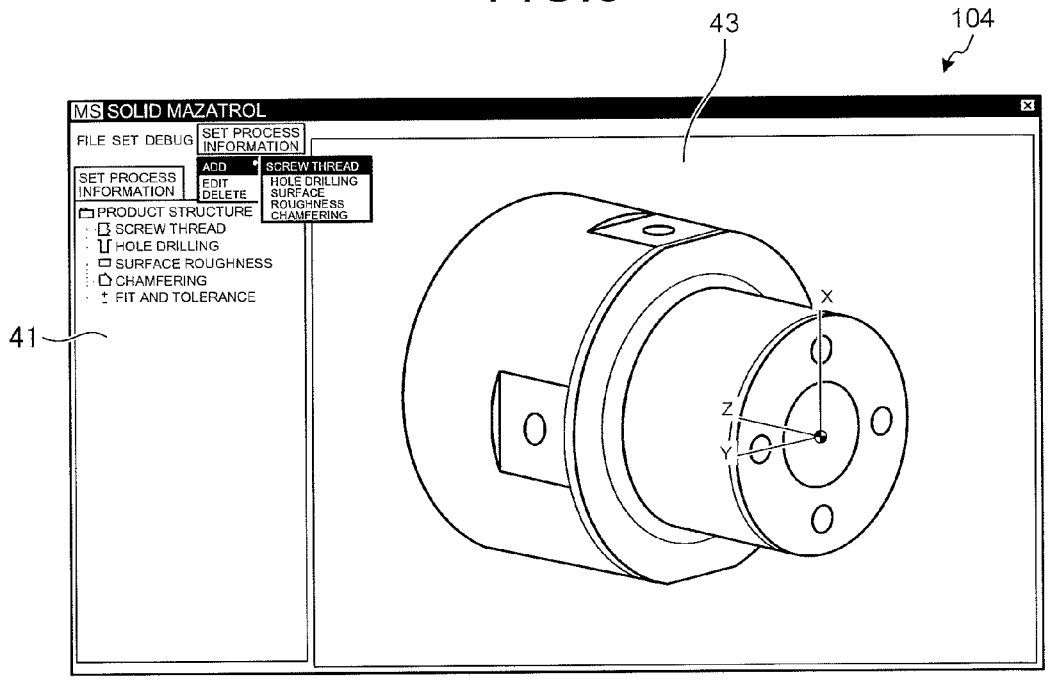
FIG. 8 is a diagram for showing an example screen for selecting a process attribute.

FIG. 8 is a diagram for showing an example screen for selecting a process attribute. In FIG. 8, a display screen 104 is presented, on which "screw thread" is selected as a process attribute from the "add" menu of the "process attribute information setting" menu.

The set-up site selecting unit 15 identifies a process attribute feasible on the processing machine, based on the product geometrical data stored in the product geometrical data storage unit 13 and the processing machine information stored in the processing machine information storage unit 18. The set-up site selecting unit 15 locates a shaping site corresponding to the identified process attribute.

Figure 9:
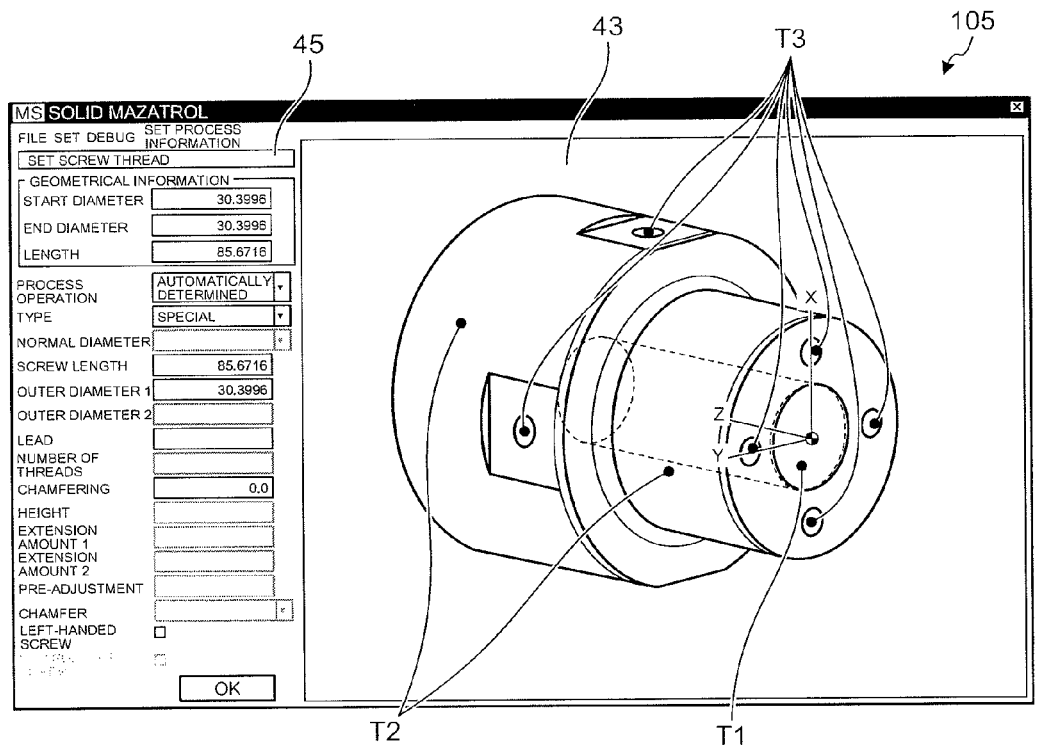
FIG. 9 is a diagram for showing an example screen after a process attribute is selected.

The set-up site selecting unit 15 displays the located shaping site as a selectable shaping site in relation to the processing machine. FIG. 9 is a diagram for showing an example screen after a process attribute is selected. In FIG. 9, a display screen 105 after "screw thread" is selected as a process attribute in FIG. 8 is presented. On the display screen 105, a window for setting detailed information regarding "screw thread" (a detailed information set-up window 45) is displayed in place of the process attribute list display window 41 of the display screen 104. In the detailed information set-up window 45 of the "screw thread", fields for inputting, for example, the start diameter and the end diameter of the threading process, the length of the screw thread ("screw length"), and the outer diameter of the screw thread are displayed. Furthermore, the set-up site selecting unit 15 executes control so that the located shaping sites are displayed as shaping sites feasible for the process operation (selectable shaping sites T1 to T3).

Thereafter, the operator externally inputs an item of shaping site designation information. This shaping site designation information item designates one of the selectable shaping sites T1 to T3 that are displayed on the display screen 105.

The set-up site selecting unit 15 determines a shaping site corresponding to the shaping site designation information as a process-target shaping site from among the displayed shaping sites, and extracts this shaping site processible on the processing machine from the product geometrical data storage unit 13. The set-up site selecting unit 15 stores the extracted shaping site as the shaping site information in the set-up site storage unit 16 (step S220).

Figure 10:
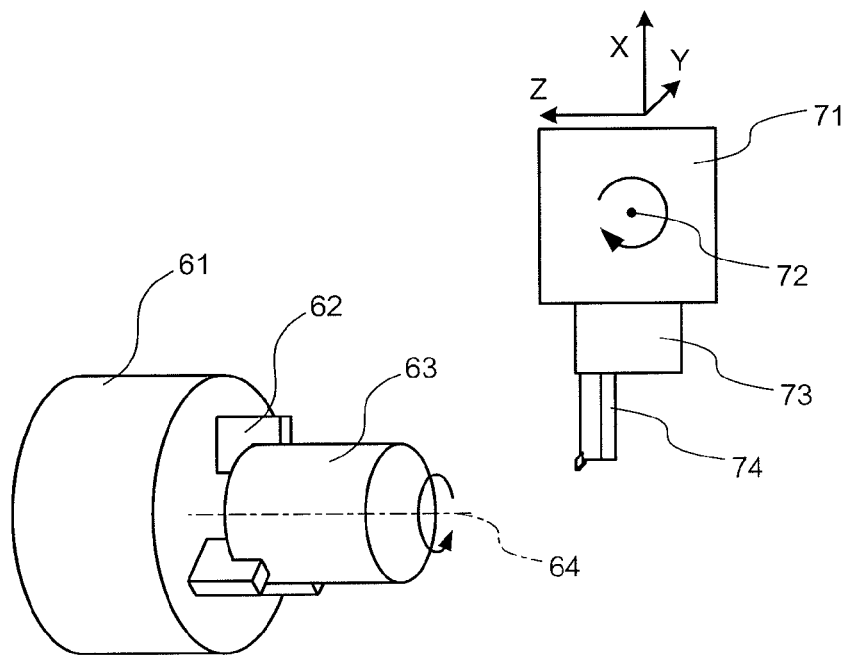
FIG. 10 is a diagram for showing the structure of a turning process performed by a B-axis complex lathe.
Figure 11:
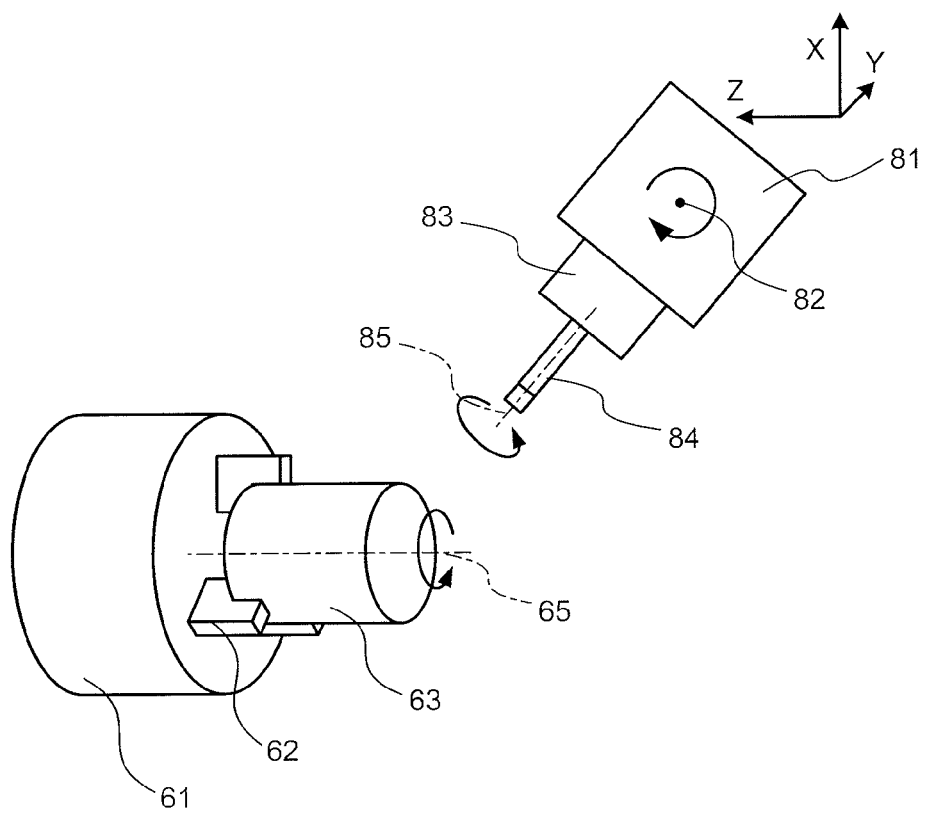
FIG. 11 is a diagram for showing the structure of a milling process performed by the B-axis complex lathe.

The structure and operation of a B-axis complex lathe (processing machine) and the processing machine information are explained now. FIGS. 10 and 11 are diagrams for showing the structure of the B-axis complex lathe. In FIG. 10, the structure of the processing machine performing a turning process is illustrated, while in FIG. 11, the structure of the processing machine performing a milling process is illustrated.

When the processing machine of FIG. 10 is to perform a turning process, a process material (workpiece) 63 is mounted onto a chuck 61 by way of a mounting retainer (e.g., jaws) 62, and a lathe turning tool (turning tool) 74 is mounted on a blade base 71 by way of a holder 73.

When the lathe turning process is performed, the lathe turning axis 64 is rotated while controlling the number of rotations of the lathe turning axis 64 to rotate the process workpiece 63, and the process workpiece 63 is subjected to the lathe turning process by use of the cutting edge of the turning tool 74.

In other words, the process workpiece 63 is continuously spun around the lathe turning axis 64 in the lathe turning process, and the blade base 71 is rotated around the blade base rotation axis (B-axis) 72 to make the turning tool 74 slanted at a specific angle. Further, the blade base 71 is moved in the X, Y, and Z directions so that the orientation and position of the turning tool 74 are determined with reference to the process workpiece 63. The processing of the process workpiece 63 is executed when the turning tool 74 is brought in contact with the spinning process workpiece 63.

In the lathe turning process, the process workpiece 63 is processed as the process workpiece 63 is being spun around the lathe turning axis 64, and therefore a screw thread whose center axis does not coincide with the lathe turning axis cannot be processed. For this reason, in the lathe turning process according to the present embodiment, if a screw thread or the like whose center axis does not coincide with the lathe turning axis is selected as a process operation, information indicating that the process cannot be performed is displayed, and this process operation is not allowed to be set in the NC program.

When the processing machine of FIG. 11 is to perform a milling process, the process workpiece 63 is mounted to the chuck 61 by way of the mounting retainer 62, and the milling tool 84 is mounted to the blade base 81 by way of a holder 83.

When forming four holes in the end surface of the product by use of the milling facility, the positional control (C-axis control) is conducted onto the lathe turning axis 64 to place the process workpiece 63 at a position for processing the holes. Moreover, when cutting a linear key groove in the peripheral surface of the product, the C-axis control is conducted to place the process workpiece 63 at a position for cutting the key groove. In addition, when cutting a groove that extends in the peripheral surface of the product in the Z-axis direction and the circumferential direction, the C-axis control is conducted to control the position of the process workpiece 63 at a very low speed in synchronism with the milling tool (end mill) 84 that moves in the Z-axis direction. In other words, in the milling process, the process workpiece 63 is rotated around the workpiece rotation axis (C-axis) 65 to position the process workpiece 63. Furthermore, the blade base 81 is rotated around the blade base rotation axis (B-axis) 82, and the blade base 81 is also moved in the X, Y, and Z directions. In this manner, the orientation and position of the milling tool 84 is determined with reference to the process workpiece 63, and the processing of the process workpiece 63 is conducted by bringing the cutting edge of the milling tool 84 that rotates around the tool rotation axis 85 in contact with the process workpiece 63.

In the milling process, when processing a screw thread, the shank portion whose center axis coincides with the lathe turning axis 64 cannot be processed. Thus, according to the present embodiment, if the shank portion whose center axis coincides with the lathe turning axis 64 is selected when performing the milling process, information indicating that the process is not feasible is displayed, and this process operation is not allowed to set in the NC program.

As discussed above, the position of the processing tool (the turning tool 74 and the milling tool 84) with reference to a process workpiece varies among different process functions of a processing machine. The position of the mounting retainer can be changed at the time of processing the process workpiece. In addition, the product geometrical data and the workpiece geometrical data can be changed for different process operations. Further, the axial direction of the rotation axis for rotating the process workpiece and the axial direction of the rotation axis for rotating the processing tool can be established within a range determined for each processing machine. Still further, the position of placing the process workpiece can be established within a range determined for each processing machine.

Thus, various process settings can be made in the processing machine in accordance with the process functions of the processing machine. According to the present embodiment, the process attribute information setting unit 17 sets up a process operation corresponding to the process function of the processing machine as the process attribute information, by use of information regarding the various process settings. More specifically, at least one of the positional information of the turning tool 74 or the milling tool 84 of the processing machine, the geometrical information of the process workpiece 63 before the processing, the information of the product structure after the processing, the positional information of the mounting retainer 62 that secures the process workpiece 63 at the processing of the product structure, the information of the axial direction of the lathe turning axis 64, the workpiece rotation axis 65, or the like for rotating the process workpiece 63, the information of the axial direction of the tool rotation axis 85 for rotating the milling tool 84, or the positional information of the placement of the process workpiece 63 is incorporated to set up the process attribute information.

Figure 12:
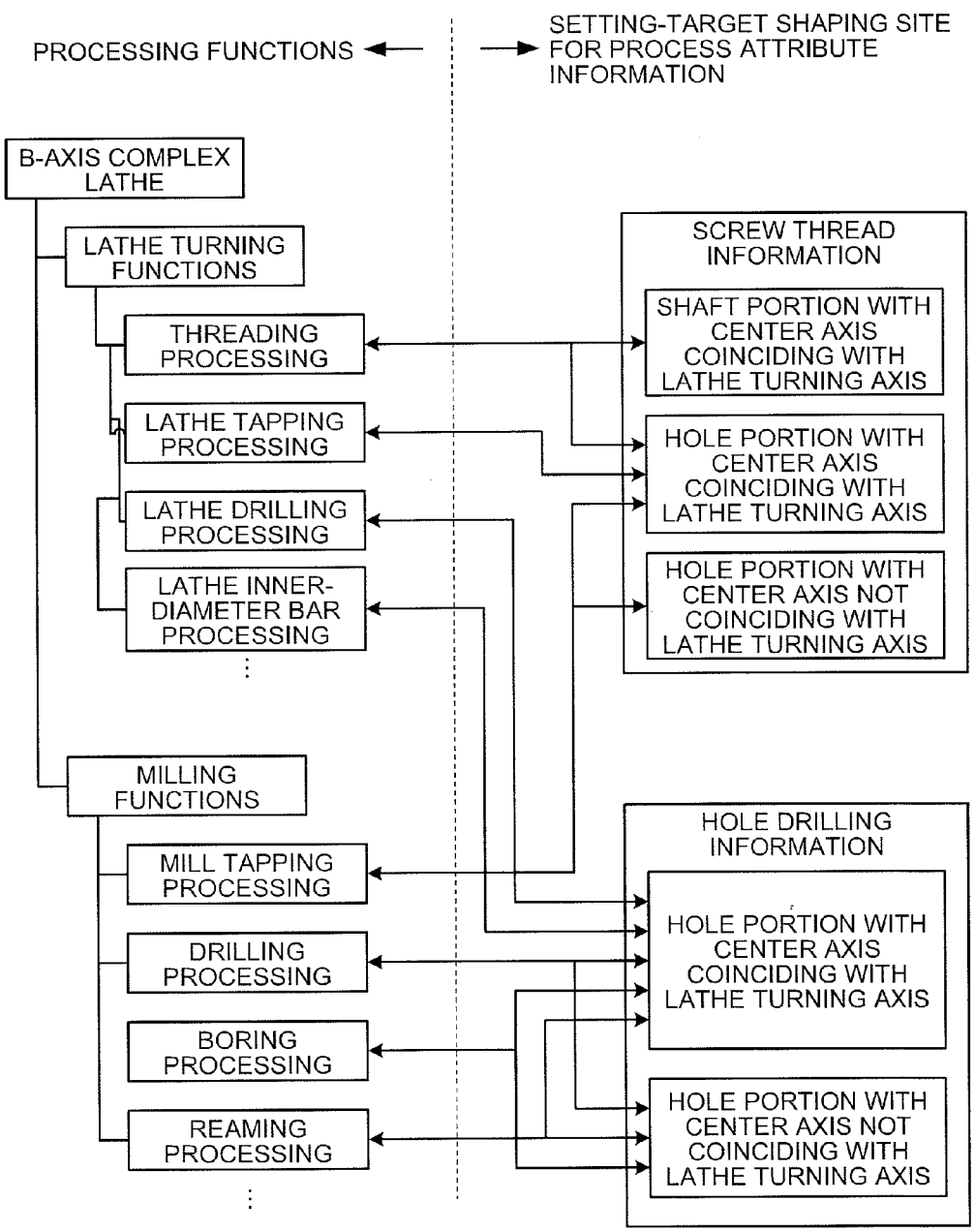
FIG. 12 is a diagram for showing an example structure of processing machine information.

FIG. 12 is a diagram for showing an example structure of the processing machine information. In FIG. 12, the processing machine information of the processing machines illustrated in FIGS. 10 and 11 (B-axis complex lathes) is indicated. The processing machine information includes process functions of the processing machine, process operations corresponding to these process functions, information of shaping sites corresponding to these process operations, and process conditions (not shown) corresponding to the process functions. In the processing machine information of FIG. 12, process functions, process operations feasible with the process functions, and shaping sites corresponding to the process operations are associated with one another.

When the processing machine is, for example, a B-axis complex lathe, it includes a lathe turning process function and a milling process function. The lathe turning process function includes, as process operation types, "threading", "lathe tapping", "lathe drilling", and "lathe inner-diameter bar processing". Further, the milling process function includes, as process operation types, "mill tapping", "drilling", "boring", and "reaming". The milling process function includes, for example, a B-axis/C-axis plane indexing function. In addition, "mill tapping" includes, for example, a B-axis/C-axis plane indexing function.

The information of the setting-target shaping site for the NC program includes information of the "screw thread" and "drilling". The "screw thread" includes a screw thread having a shank whose center axis of processing coincides with the rotation axis of the lathe (lathe turning axis 64), a screw thread having a hole whose center axis of processing coincides with the lathe turning axis, and a screw thread having a hole whose center axis of processing does not coincide with the lathe turning axis. Moreover, the "drilling" includes drilling of a hole whose center axis of processing coincides with the rotation axis of the turning (tool rotation axis 85) and drilling of a hole whose center axis of processing does not coincide with the rotation axis of the turning.

A screw thread having a shank whose center axis coincides with the lathe turning axis can be processed by "threading", and a screw thread having a hole whose center axis coincides with the lathe turning axis can be processed by "threading", "lathe tapping", and "mill tapping". Furthermore, a screw thread having a hole whose center axis does not coincide with the lathe turning axis can be processed by "mill tapping".

Drilling of a hole having the center axis that coincides with the lathe turning axis can be processed by "lathe drilling", "lathe inner diameter bar processing", "drilling", "boring", and "reaming". In addition, drilling of a hole having the center axis that does not coincide with the lathe turning axis can be processed by "drilling", "boring", and "reaming".

In the structure display window 43 of FIG. 9, the shaping sites T1 to T3 that are selectable in relation to the process attribute "screw thread" of the process attribute information are indicated. The selectable shaping site T1 is a hole portion whose center axis coincides with the lathe turning axis. The selectable shaping sites T2 are shank portions whose center axis coincides with the lathe turning axis. The selectable shaping sites T3 are hole portions whose center axis does not coincide with the lathe turning axis.

When the control-target processing machine is provided with a lathe turning function and "threading" is selected, it is determined based on the processing machine information that the selectable shaping site T2 can be processed. In other words, the selectable shaping site T2 becomes selectable when the lathe threading function is used.

When the control-target processing machine is provided with a milling function and "mill tapping" is selected, or when the control-target processing machine is provided with a lathe turning function and "threading" (female screw processing) is selected, it is determined on the basis of the processing machine information that the selectable shaping sites T1 and T3 can be processed. In other words, the selectable shaping sites T1 and T3 become selectable when the tap milling function or the lathe threading function is used.

After the set-up site selecting unit 15 selects the setting-target shaping site of the process attribute information and stores it in the set-up site storage unit 16, the process attribute information setting unit 17 sets up the initial process operation and input items for the initial process operation with respect to the selected shaping site, based on the processing machine information (step S230).

The process attribute information setting unit 17 determines whether an instruction for adding a setting-target shaping site to the currently set-up process attribute information (additional selection) is issued by the operator (step S240). When an instruction for adding a shaping site is issued (yes at step S240), the set-up site selecting unit 15 adds the shaping site externally input by the operator to the set-up site storage unit 16 (step S250). Thereafter, the set-up site selecting unit 15 adds all the shaping sites externally input by the operator to the set-up site storage unit 16 (steps S240 and S250).

When there is no more instruction for adding a new shaping site (no at step S240), the process attribute information setting unit 17 determines whether the operator inputs to the set-up site selecting unit 15 an instruction for cancelling a selection-target shaping site in the currently set-up process attribute information.

When an instruction for cancelling the selective-state of a shaping site is input to the set-up site selecting unit 15 (yes at step S260), the set-up site selecting unit 15 deletes the shaping site designated for cancellation by the operator from the set-up site storage unit 16, and thereby cancels the selective state (step S270).

Thereafter, the set-up site selecting unit 15 determines whether there is any selected shaping site, as a result of the selective-state cancellation (step S280). If there is a selected shaping site (yes at step S280), the process attribute information setting unit 17 and the set-up site selecting unit 15 repeat the operations of steps S240 to S280. In other words, when an instruction for adding a shaping site is issued, the shaping site is added, and when an instruction for cancelling the shaping site, the selective state of the shaping site is cancelled.

On the other hand, when there is no selected shaping site (no at step S280), the process attribute information setting unit 17 and the set-up site selecting unit 15 perform the operation of step S220. In other words, the set-up site selecting unit 15 selects a setting-target shaping site of the process attribute information from the product structure, based on the shaping site information, and stores the information of the selected shaping site in the set-up site storage unit 16 (step S220). In this manner, the set-up site selecting unit 15 and the process attribute information setting unit 17 returns to the selection of the first shaping site to redo the process attribute information adding process.

The set-up site selecting unit 15 and the process attribute information setting unit 17 repeat the operations of steps S220 to S260 until there is no more instruction for adding a shaping site or instruction for cancelling the selective state of the shaping site. When there is no more instruction for cancelling the selective state of the shaping site (no at step S260), the process attribute information setting unit 17 determines whether the operator inputs detailed information (step S290). When any detailed information is input (yes at step S290), the process attribute information setting unit 17 determined whether an instruction for changing a process operation is input as the detailed information (step S300).

When an instruction for changing process operations is input to the process attribute information setting unit 17 (yes at step S300), the process attribute information setting unit 17 changes the process operation types in response to the process operation changing instruction, and also switches the display screen of the process attribute information displaying unit 21 to a screen (input items) (a detailed information input and edit field 49 that is discussed later) corresponding to the changed process operation (step S310).

More specifically, the process attribute information setting unit 17 extracts process operation types that are selectable with respect to the currently selected shaping site, based on the processing machine information. Then, the process attribute information setting unit 17 allows the operator to select a process operation from the extracted process operation types, and switches the screen to the one corresponding to the selected process operation type (input items corresponding to the selected process operation).

Figure 13:
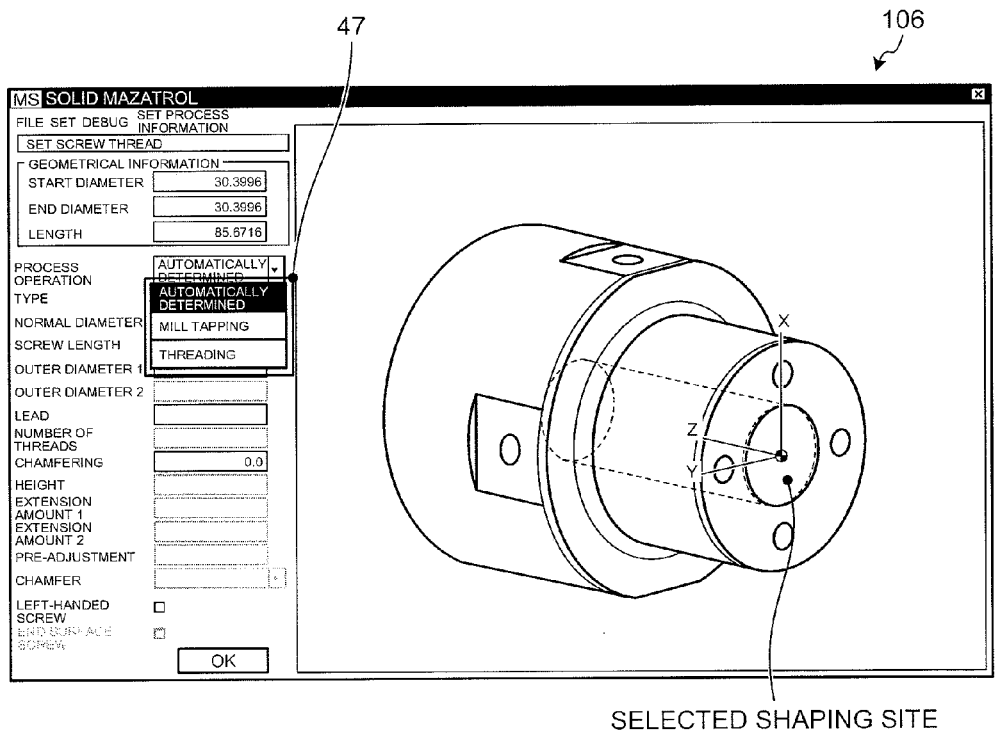
FIG. 13 is a diagram for showing an example screen for selecting a process operation when changing process operations.

FIG. 13 is a diagram for showing an example screen for selecting a process operation when changing process operations. In FIG. 13, a display screen 106 is illustrated, where a hole portion whose center axis corresponds to the lathe turning axis is selected as the setting-target shaping site when setting a "screw thread". A process operation selection option field 47 is displayed on the display screen 106. The process operation selection option field 47 is an area displaying feasible process operations with respect to the selected shaping site. According to the present embodiment, because the control-target processing machine is a complex lathe, "mill tapping" of the milling function and "threading" of the lathe turning function are displayed in the process operation selection option field 47.

Figure 14:
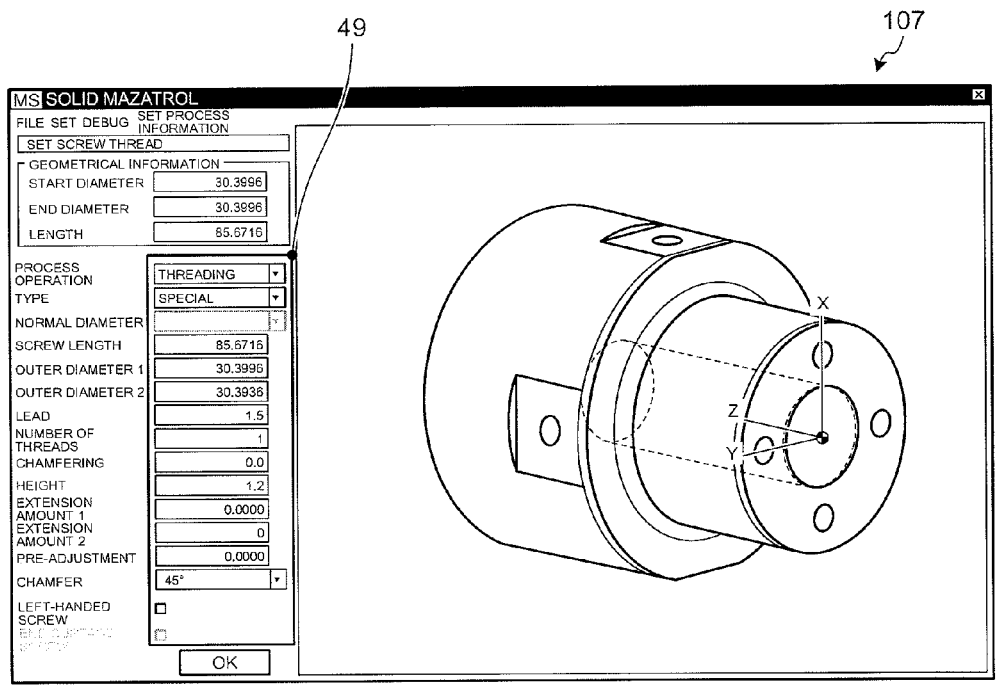
FIG. 14 is a diagram for showing a display screen presented when threading is selected as a process operation.

FIG. 14 is a diagram for showing a display screen when threading is selected as a process operation. In FIG. 14, the detailed information item input screen is shifted from the screen of FIG. 13 for selecting a process operation to a screen for inputting items regarding the "threading". The input items related to the "threading" are displayed as the detailed information input and edit field 49 on the display screen 107.

When the detailed information input to the process attribute information setting unit 17 is not a process operation changing instruction (no at step S300), the process attribute information setting unit 17 changes the values of the input items to the setting values of the input items that are input as detailed information (step S320).

After the process attribute information setting unit 17 changes the process operation types or the setting values of the input items, the process attribute information setting unit 17 and the set-up site selecting unit 15 repeat the operations of steps S240 through S320. In other words, when a shaping site adding instruction is issued, the shaping site is added, and when a shaping site cancelling instruction is issued, the selective state of the shaping site is cancelled. Furthermore, when detailed information is input, the process operation types and the setting values of the input items are changed.

When the process attribute information setting unit 17 determines whether the operator inputs the detailed information, and if no detailed information is input (no at step S290), the process attribute information setting unit 17 determines whether the operator inputs a cancellation instruction regarding the current setting operation of the process attribute information to the geometrical data input unit 12 (step S330). When the cancellation instruction is issued, the process attribute information setting unit 17 terminates the process attribute information setting operation. Here, the process attribute information setting unit 17 cancels the process of adding the process attribute information, and does not allow any new item of process attribute information to be added.

On the other hand, when a cancellation instruction is not input to the geometrical data input unit 12 (no at step S330), the process attribute information setting unit 17 determines whether the operator inputs an instruction for fixing the setting of the currently set process attribute information to the geometrical data input unit 12 (step S340).

When no instruction for fixing the setting of the process attribute information is input to the geometrical data input unit 12 (no at step S340), the set-up site selecting unit 15 and the process attribute information setting unit 17 repeat the operations of steps S240 through S340 until no more instruction for adding a shaping site or for cancelling the selective state of a shaping site is present.

In other words, when an instruction for adding a shaping site is issued, the shaping site is added, and when an instruction for cancelling a shaping site, the selective state of the shaping site is cancelled. Moreover, when detailed information is input, the process operation types or setting values of input items are changed. Still further, when an instruction for cancelling the process attribute information setting operation is issued, the process attribute information setting unit 17 terminates the process attribute information setting operation.

When an instruction for fixing the setting of the process attribute information is issued to the geometrical data input unit 12 (yes at step S340), the process attribute information setting unit 17 adds the currently set process attribute information into the process attribute information storage unit 19, and terminates the process attribute information setting operation (step S350).

Figure 15:
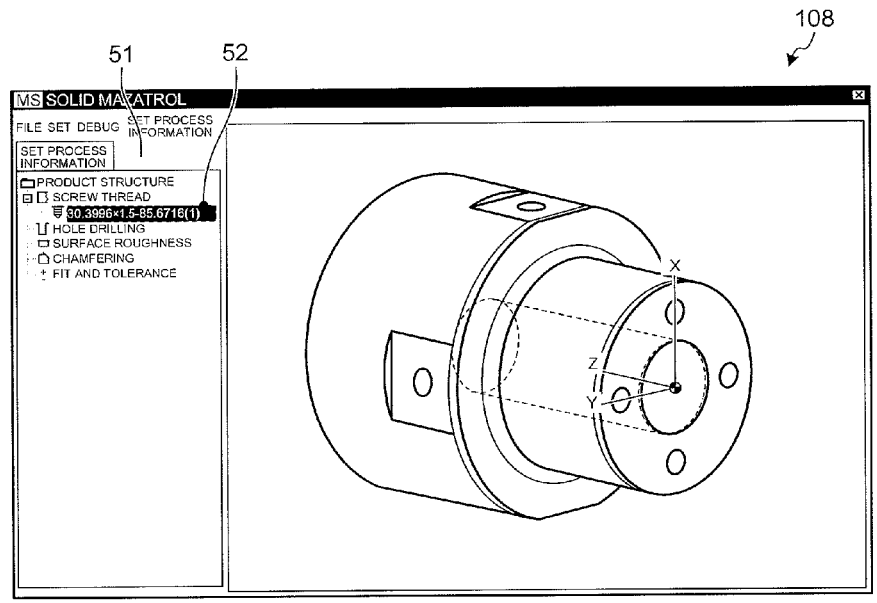
FIG. 15 is a diagram for showing a display screen after a screw thread processing condition is added as the process attribute information.

FIG. 15 is a diagram for showing a display screen after processing conditions for a screw thread are added as the process attribute information. In the display screen 108 after a process attribute is added, a window for displaying a list of process attributes (list display window 51) is displayed in place of the window for setting details of the process attribute information, and an added process condition 52 is displayed in the list display window 51.

After adding the new process attribute information (after the operation of step S70), the NC program generating device 1 returns to the operation of step S30 in FIG. 2. In other words, the process infeasibility information extracting unit 20 notifies the process attribute information displaying unit 21 of the process attribute information that is infeasible as a result of the determination. The process attribute information displaying unit 21 displays a list of process operations of the process attribute information that is set for the product structure by dividing them into processible operations and not-processible operations, based on the process attribute information received from the process attribute information storage unit 19 and the infeasible process attribute information notified by the process infeasibility information extracting unit 20 (step S30). Then, when an instruction for adjusting the placement of the product structure is input (yes at step S40), the geometrical data input unit 12 adjusts the placement of the product structure in response to the operator's instruction (step S50). Furthermore, when an instruction for adding the process attribute information (yes at step S60), the process attribute information setting unit 17 adds the new process attribute information in response to the operator's instruction (step S70).

When the process attribute information setting unit 17 determines whether an instruction for adding the process attribute information is issued by the operator (step S60), and if no instruction for adding the process attribute information is input (no at step S60), the process attribute information setting unit 17 determines whether the selection of the process attribute information displayed in the process attribute list display window 41 has been made by the operator (step S80).

If the selection of the process attribute information has been made (yes at step S80), the process attribute information setting unit 17 updates (changes) the setting-target process attribute information to the currently selected process attribute information (the process attribute information newly selected by the operator) (step S90). The operation of step S90 is to determine which of the process attributes should be selected when there is more than one process attribute, and the operation is important for change of the process attribute information that is described later (later-described step S110) and deletion of the process attribute information that is described later (later-described step S130).

Thereafter, the NC program generating device 1 returns to the operation of step S30. Then, the NC program generating device 1 repeats the operations of steps S30 through S90 as long as instructions for selecting the process attribute information are input by the operator. During this time, if an instruction for adjusting the placement of the product structure is input (yes at step S40), the geometrical data input unit 12 adjusts the placement of the product structure in response to the operator's instruction (step S50). Furthermore, when an instruction for adding the process attribute information is input (yes at step S60), the process attribute information setting unit 17 adds the new process attribute information in response to the operator's adding instruction (step S70). Still further, when the process attribute information is newly selected (yes at step S80), the process attribute information setting unit 17 updates the setting-target process attribute information to the currently selected process attribute information (step S90).

When there is no more instruction for selecting the process attribute information (no at step S80), the process attribute information setting unit 17 determines whether the operator issues an instruction for changing the contents of the currently selected process attribute information (step S100). When an instruction for changing the contents of the process attribute information is issued (yes at step S100), the process attribute information setting unit 17 changes the contents of the process attribute information in response to the operator's change instruction, and stores it in the process attribute information storage unit 19 (step S110). Here, the process attribute information setting unit 17 changes the contents of the process attribute information by the same operations as steps S240 through S350 of FIG. 7.

Thereafter, the NC program generating device 1 returns to the operation of step S30. Then, the NC program generating device 1 repeats the operations of steps S30 through S110 as long as instructions for changing the contents of the process attribute information are input by the operator. During this time, if the instruction for adjusting the placement of the product structure is input (yes at step S40), the geometrical data input unit 12 adjusts the placement of the product structure in response to the operator's instruction (step S50). Further, when the instruction for adding the process attribute information is input (yes at step S60), the process attribute information setting unit 17 adds the new process attribute information in response to the operator's adding instruction (step S70). Moreover, when the process attribute information is newly selected (yes at step S80), the process attribute information setting unit 17 updates the setting-target process attribute information to the currently selected process attribute information (step S90). In addition, when the instruction for changing the contents of the process attribute information is input (yes at step S100), the process attribute information setting unit 17 changes the contents of the process attribute information in response to the operator's change instruction and stores it in the process attribute information storage unit 19 (step S110).

When there is no more instruction for changing the contents of the process attribute information (no at step S110), the process attribute information setting unit 17 determines whether the instruction for deleting the currently selected process attribute information is issued by the operator (step S120). When the instruction for deleting the process attribute information is issued (yes at step S120), the currently selected process attribute information (the process attribute information instructed to delete) is deleted from the process attribute information storage unit 19 (step S130).

Thereafter, the NC program generating device 1 returns to the operation of step S30. Then, as long as the instruction for deleting the content of the process attribute information is input by the operator, the NC program generating device 1 repeats the operations of steps S30 through S130. During this time, when the instruction for adjusting the placement of the product structure is input (yes at step S40), the geometrical data input unit 12 adjusts the placement of the product structure in response to the operator's instruction (step S50). In addition, when the instruction for adding the process attribute information is input (yes at step S60), the process attribute information setting unit 17 adds the new process attribute information in response to the operator's adding instruction (step S70). Furthermore, when the process attribute information is newly selected (yes at step S80), the process attribute information setting unit 17 updates the setting-target process attribute information to the currently selected process attribute information (step S90). In addition, when the instruction for changing the contents of the process attribute information is input (yes at step S100), the process attribute information setting unit 17 changes the contents of the process attribute information in response to the operator's change instruction, and stores it in the process attribute information storage unit 19 (step S110). Still further, when the instruction for deleting the currently selected process attribute information is input, the process attribute information setting unit 17 deletes the currently selected process attribute information from the process attribute information storage unit 19 (step S130).

Figure 16:
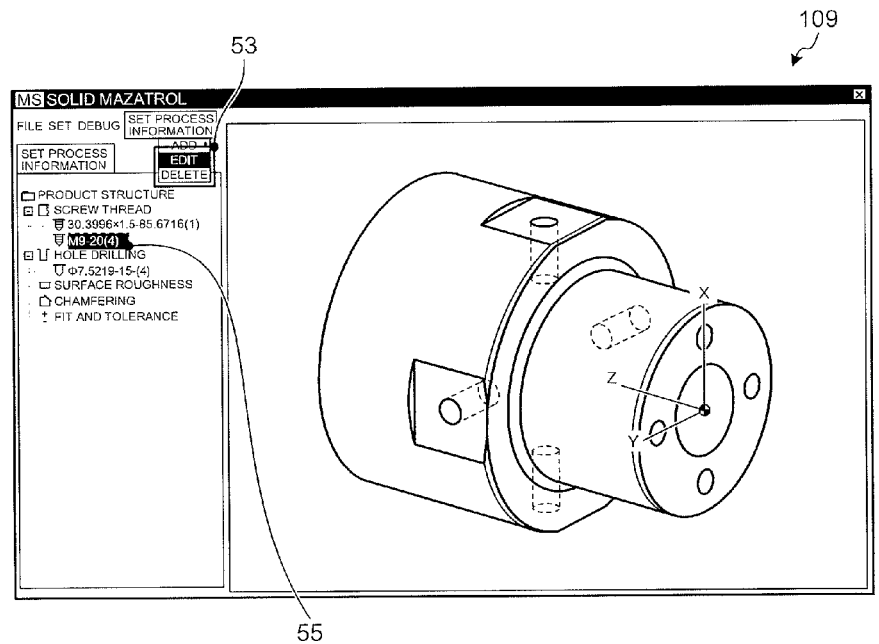
FIG. 16 is a diagram for showing an example screen for instructing edits and deletion of the process attribute information.

FIG. 16 is a diagram for showing an example screen for instructing edits and deletion of the process attribute information. As illustrated in this drawing, an operation selection field 53 is provided to select an operation such as "edit" and "delete" with regard to the selected process attribute information in a display screen 109 for editing and deleting the process attribute information. In FIG. 16, a threading condition 55 is selected as edit-target process attribute information.

When there is no more instruction for changing the contents of the process attribute information (no at step S120), the process attribute information setting unit 17 determines whether the operator inputs an instruction for terminating the setting of the process attribute information to the geometrical data input unit 12 (step S140).

When an instruction for terminating the setting of the process attribute information is input (yes at step S140), the NC program generating unit 22 automatically generates an NC program, based on the product geometrical data in which the process attribute information is set up and the workpiece geometrical data (step S150). The NC program generating unit 22 stores the generated NC program in the NC program storage unit 23.

On the other hand, when there is no instruction for terminating the setting of the process attribute information (no at step S140), the NC program generating device 1 returns to the operation of step S40. Then, until the operator inputs the instruction for terminating the setting of the process attribute information, the processes of adding, changing, and deleting the process attribute information are performed.

According to the present embodiment, process operation types that are feasible on the control-target processing machine with respect to a three-dimensional product structure can be set up for the NC program. Thus, a suitable NC program can be readily generated in correspondence with the control-target processing machine.

Furthermore, an operation for obtaining a suitable NC program in correspondence with the control-target processing machine can be conducted by setting process attributes, shaping sites, and process operations for the three-dimensional structure of a product, and thus the NC program can be readily generated. In addition, process operations corresponding to various process settings that can be dealt with on the processing machine can be set in an NC program. Thus, a suitable NC program can be generated in correspondence with the processing machine and the process settings.

Furthermore, process operation types that are feasible on the processing machine are displayed, and a process operation is determined from the displayed process operations by the operator to be set in the NC program. Thus, the operator can readily select the process operation in accordance with the processing machine and can readily obtain a suitable NC program in correspondence with the processing machine.

Still further, the process operation corresponding to the processing machine and detailed information on process settings (such as process conditions) are set as the process attribute information, and therefore settings can be made in detail for the process settings in the NC program.

INDUSTRIAL APPLICABILITY

As discussed above, the NC program generating device and the NC program generating method according to the present invention are suitable for the generation of an NC program.

The invention claimed is:

1. An NC program generating device that extracts shaping sites, which are process areas of a workpiece, based on three-dimensional geometrical data of the workpiece that is unprocessed and three-dimensional geometrical data of the workpiece that is processed, and generates an NC program in correspondence with the shaping sites that are extracted, comprising:

a process attribute information setting unit that sets process attribute information that is used for generation of the NC program and includes information of a process operation that can be used to process the workpiece on a processing machine, in the three-dimensional geometrical data of the workpiece that is processed, wherein:

the process attribute information setting unit sets the process attribute information of the workpiece, based on related information of the process operation that can be used to process the workpiece on the processing machine and a characteristic, a position, and a direction of a shaping site in a three-dimensional shape of the workpiece that is processed, the shaping site being configurable as the process attribute information for the workpiece on the processing machine, and when setting up the process attribute information of the workpiece, feasible items and infeasible items of the process attribute information are extracted by use of at least one of information regarding a position of a processing tool included in the processing machine, information regarding an axial direction of a rotation axis around which the workpiece is rotated, information regarding an axial direction of a rotation axis around which the working tool is rotated, and information regarding a placement position of the workpiece.

2. An NC program generating device that extracts shaping sites, which are process areas of a workpiece, based on three-dimensional geometrical data of the workpiece that is unprocessed and three-dimensional geometrical data of the workpiece that is processed, and generates an NC program in correspondence with the shaping sites that are extracted, comprising:

a process attribute information setting unit that sets process attribute information that is used for generation of the NC program and includes information of a process operation that can be used to process the workpiece on a processing machine, in the three-dimensional geometrical data of the workpiece that is processed, wherein:

the process attribute information setting unit sets the process attribute information of the workpiece, based on related information of the process operation that can be used to process the workpiece on the processing machine and a characteristic, a position, and a direction of a shaping site in a three-dimensional shape of the workpiece that is processed, the shaping site being configurable as the process attribute information for the workpiece on the processing machine, and when setting up the process attribute information of the workpiece, feasible items and infeasible items of the process attribute information are extracted by use of at least one of information regarding a position of a processing tool included in the processing machine, information regarding an axial direction of a rotation axis around which the workpiece is rotated, information regarding an axial direction of a rotation axis around which the working tool is rotated, and information regarding a placement position of the workpiece; and a displaying unit that displays process operation types included in the process attribute information that is set by the process attribute information setting unit, wherein:

the NC program is generated by use of a process operation type determined from the process operation types that are displayed by the displaying unit in response to an externally input instruction.

3. The NC program generating device according to claim 2, wherein the displaying unit displays shaping sites that can be processed by the process operation in a manner distinguishable from shaping sites that cannot be processed by the process operation.

4. The NC program generating device according to claim 2, wherein the displaying unit displays a shaping site that is determined as not being processible by the process operation based on a rotation axis around which a possible processing tool of the processing machine is rotated and a center axis of a processing site of the workpiece situated onto the processing machine, by associating the shaping site with information indicating that the shaping site is not processible.

5. An NC program generating method with which shaping sites, which are process areas of a workpiece, are extracted based on three-dimensional geometrical data of the workpiece that is unprocessed and three-dimensional geometrical data of the workpiece that is processed, and an NC program is generated in correspondence with the shaping sites that are extracted, comprising:
  a process attribute information setting step of setting process attribute information that is used for generation of the NC program and includes information of a process operation that can be used to process the workpiece on a processing machine, in the three-dimensional geometrical data of the workpiece that is processed, wherein:
  at the process attribute information setting step, the process attribute information of the workpiece is set, based on related information of the process operation that can be used to process the workpiece on the processing machine and a characteristic, a position, and a direction of a shaping site in a three-dimensional shape of the workpiece that is processed, the shaping site being configurable as the process attribute information for the workpiece on the processing machine, and, when setting up the process attribute information of the workpiece, feasible items and infeasible items of the process attribute information are extracted by use of at least one of information regarding a position of a processing tool included in the processing machine, information regarding an axial direction of a rotation axis around which the workpiece is rotated, information regarding an axial direction of a rotation axis around which the working tool is rotated, and information regarding a placement position of the workpiece.

6. An NC program generating method with which shaping sites, which are process areas of a workpiece, are extracted based on three-dimensional geometrical data of the workpiece that is unprocessed and three-dimensional geometrical data of the workpiece that is processed, and an NC program is generated in correspondence with the shaping sites that are extracted, comprising:
  a process attribute information setting step of setting process attribute information that is used for generation of the NC program and includes information of a process operation that can be used to process the workpiece on a processing machine, in the three-dimensional geometrical data of the workpiece that is processed, wherein:
  at the process attribute information setting step, the process attribute information of the workpiece is set, based on related information of the process operation that can be used to process the workpiece on the processing machine and a characteristic, a position, and a direction of a shaping site in a three-dimensional shape of the workpiece that is processed, the shaping site being configurable as the process attribute information for the workpiece on the processing machine, and, when setting up the process attribute information of the workpiece, feasible items and infeasible items of the process attribute information are extracted by use of at least one of information regarding a position of a processing tool included in the processing machine, information regarding an axial direction of a rotation axis around which the workpiece is rotated, information regarding an axial direction of a rotation axis around which the working tool is rotated, and information regarding a placement position of the workpiece;
  displaying process operation types included in the process attribute information that is set by the process attribute information setting step; and
  generating the NC program by use of a process operation type determined from the process operation types that are displayed in response to an externally input instruction.

7. The NC program generating method of claim 6, wherein the displaying comprises displaying shaping sites that can be processed by the process operation in a manner distinguishable from shaping sites that cannot be processed by the process operation.

8. The NC program generating method of claim 6, wherein the displaying comprises displaying a shaping site that is determined as not being processible by the process operation based on a rotation axis around which a possible processing tool of the processing machine is rotated and a center axis of a processing site of the workpiece situated onto the processing machine, by associating the shaping site with information indicating that the shaping site is not processible.

9. An NC program generating method with which shaping sites, which are process areas of a workpiece, are extracted based on three-dimensional geometrical data of the workpiece that is unprocessed and three-dimensional geometrical data of the workpiece that is processed, and an NC program is generated in correspondence with the shaping sites that are extracted, comprising:
  a process attribute information setting step of setting process attribute information that is used for generation of the NC program and includes information of a process operation that can be used to process the workpiece on a processing machine, in the three-dimensional geometrical data of the workpiece that is processed, wherein:
  at the process attribute information setting step, the process attribute information of the workpiece is set, based on related information of the process operation that can be used to process the workpiece on the processing machine and a characteristic, a position, and a direction of a shaping site in a three-dimensional shape of the workpiece that is processed, the shaping site being configurable as the process attribute information for the workpiece on the processing machine, and, when setting up the process attribute information of the workpiece, feasible items and infeasible items of the process attribute information are extracted by use of at least one of information regarding a position of a processing tool included in the processing machine, information regarding an axial direction of a rotation axis around which the workpiece is rotated, information regarding an axial direction of a rotation axis around which the working tool is rotated, and information regarding a placement position of the workpiece,
  wherein the process attribute information setting step comprises setting the process attribute information, based on processing machine information regarding a process operation that is feasible on the processing machine or a process condition that is feasible on the processing machine.

10. NC program generating device that extracts shaping sites, which are process areas of a workpiece, based on three-dimensional geometrical data of the workpiece that is unprocessed and three-dimensional geometrical data of the workpiece that is processed, and generates an NC program in correspondence with the shaping sites that are extracted, comprising:

a process attribute information setting unit that sets process attribute information that is used for generation of the NC program and includes information of a process operation that can be used to process the workpiece on a processing machine, in the three-dimensional geometrical data of the workpiece that is processed, wherein:

the process attribute information setting unit sets the process attribute information of the workpiece, based on related information of the process operation that can be used to process the workpiece on the processing machine and a characteristic, a position, and a direction of a shaping site in a three-dimensional shape of the workpiece that is processed, the shaping site being configurable as the process attribute information for the workpiece on the processing machine, and when setting up the process attribute information of the workpiece, feasible items and infeasible items of the process attribute information are extracted by use of at least one of information regarding a position of a processing tool included in the processing machine, information regarding an axial direction of a rotation axis around which the workpiece is rotated, information regarding an axial direction of a rotation axis around which the working tool is rotated, and information regarding a placement position of the workpiece, wherein:

the process attribute information setting unit sets the process attribute information, based on processing machine information regarding a process operation that is feasible on the processing machine or a process condition that is feasible on the processing machine.

* * * * *